(12) United States Patent
Konno (10) Patent No.: US 7,359,307 B2
(45) Date of Patent: Apr. 15, 2008

(54) CATADIOPTRIC OBJECTIVE SYSTEM AND OBJECTIVE SYSTEM

(75) Inventor: Kenji Konno, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 527 days.

(21) Appl. No.: 10/969,555

(22) Filed: Oct. 20, 2004

(65) Prior Publication Data
US 2005/0094540 A1 May 5, 2005

(30) Foreign Application Priority Data
Oct. 29, 2003 (JP) .............................. 2003-368964

(51) Int. Cl.
*G11B 7/00* (2006.01)

(52) U.S. Cl. .............................. 369/112.23; 369/112.01

(58) Field of Classification Search ...................... None
See application file for complete search history.

(56) References Cited

U.S. PATENT DOCUMENTS

| | | | |
|---|---|---|---|
| 5,657,168 A * | 8/1997 | Maruyama et al. .... | 369/112.24 |
| 6,266,315 B1 | 7/2001 | Lee et al. .............. | 369/112.01 |
| 6,768,556 B1 * | 7/2004 | Matsumoto et al. ........ | 356/601 |
| 6,859,334 B1 * | 2/2005 | Kuiseko et al. .......... | 369/44.11 |
| 2002/0014575 A1 * | 2/2002 | Hatano et al. ............ | 250/201.5 |

FOREIGN PATENT DOCUMENTS

| | | |
|---|---|---|
| JP | 2000-162503 A | 6/2000 |
| JP | 2002-048973 A | 2/2002 |

* cited by examiner

*Primary Examiner*—Thang V. Tran
*Assistant Examiner*—Jorge L. Ortiz-Criado
(74) *Attorney, Agent, or Firm*—Sidley Austin LLP (57) ABSTRACT

A catadioptric objective system used for storage and/or reproduction of information by use of an optical near field. The catadioptric objective system is composed of a catadioptric objective lens and a light transmitting plate. The lens has a first surface and a second surface. The first surface has a positive optical power and transmits incident rays. The second surface has a positive optical power and reflects incident rays, and a plane portion is formed in the center of the second surface. The light transmitting plate has a third surface and a fourth surface which are substantially parallel to each other, and the third surface is bonded to the second surface. Incident rays pass through the first surface and are reflected by the second surface. Thereafter, the rays enter into the first surface again and are reflected by the first surface. Then, the rays pass through the plane portion of the second surface, and the rays are converged in vicinity of the fourth surface.

21 Claims, 7 Drawing Sheets

CATADIOPTRIC OBJECTIVE SYSTEM AND OBJECTIVE SYSTEM

This application is based on Japanese application No. 2003-368964 filed on Oct. 29, 2003, the content of which is herein incorporated by reference.

BACKGROUND OF THE INVENTION

1. Field of the Invention

The present invention relates to a catadioptric objective system, and particularly to a catadioptric objective system which is used for forming a micro beam spot, and more particularly to a catadioptric objective system which is suited to be used for storage and/or reproduction of information by use of an optical near field.

2. Description of Related Art

In the art of optical storage/reproduction, in order to form a micro beam spot, generally, it is desired to converge a light beam to the diffraction limit by use of an optical system with the highest possible numerical aperture. However, the minimization of a beam spot by use of conventional lenses has reached the limit. This means that objective lenses which propagate light in the air have been improved to have numerical apertures of almost 1.0.

It is possible to heighten the limit of a beam spot diameter by providing a dielectric around the converging point, and Japanese Patent Laid-Open Publication Nos. 2002-48973 (reference 1) and 2000-162503 (reference 2) suggest the effective numerical aperture be heightened by use of a solid immersion lens made of a high-refractive material.

Both of the solid immersion lenses disclosed by the references 1 and 2 converge a light on their respective lens surfaces. When storage and/or reproduction of information are carried out by use of an optical near field, the distance between the lens surface (converging point) and a storage medium must be controlled within a very small value less than a wavelength of light. However, since the lens surface has a curvature, it is difficult to measure and control the very small distance between the converging point and the storage medium.

The reference 1 suggests a small opening be formed around the converging point on the lens surface. However, a process of forming a fine structure such as a very small opening on the curved lens surface by use of an electronic beam includes a very difficult work such as focusing of the electronic beam.

The solid immersion mirror disclosed by the reference 1 is composed of a plane surface (incident surface) and a convex surface, that is, the solid immersion mirror has only one optical surface. Accordingly, it is difficult to suppress a spherical aberration and a coma aberration, and off-axis aberrations, particularly, the coma aberration are large.

SUMMARY OF THE INVENTION

An object of the present invention is to provide a catadioptric objective system and an objective system which are of a simple structure, which can form a micro beam spot with small aberrations and which can position a converging point closer to a storage medium easily.

The first aspect of the present invention relates to a catadioptric objective system used for storage/reproduction of information by use of an optical near field, and in order to attain the object, a catadioptric objective system according to the present invention comprises: a catadioptric objective lens comprising a first surface and a second surface, the first surface having a positive optical power and transmitting incident rays, the second surface having a positive optical power, reflecting incident rays and having a plane portion in a center; and a light transmitting plate comprising a third surface and a fourth surface, the third surface being bonded to the second surface of the catadioptric objective lens by an adhesive agent. In the catadioptric objective system, incident rays pass through the first surface of the catadioptric objective lens, are reflected by the second surface, are reflected by the first surface, pass through the plane portion of the second surface and are converged in vicinity of the fourth surface of the plate.

The second aspect of the present invention relates to an objective system for storing/reproducing information in/from a storage medium, and in order to attain the object, the objective system comprises: a catadioptric optical element comprising a first surface having a positive optical power and transmitting incident rays, and a second surface having a positive optical power, reflecting incident rays and having a plane portion in a center; and a light transmitting plate comprising a third surface bonded to the second surface of the catadioptric objective lens by an adhesive agent, and a fourth surface substantially in parallel to the third surface. In the objective system, incident rays pass through the first surface of the catadioptric optical element, are reflected by the second surface, are reflected by the first surface, pass through the plane portion of the second surface and are converged in vicinity of the fourth surface, and by use of the converged rays, information is stored/reproduced in/from a storage medium.

The catadioptric objective system is composed of a catadioptric objective lens and a light transmitting plate which are bonded together, and the fourth surface, which is a light converging surface, is a plane. Therefore, it is easy to measure and control the small distance between the converging point and a storage medium, and it is possible to make the converging point closer to the storage medium easily. Further, since the fourth surface (converging surface) is a plane, it is easy to form a fine structure, which is to generate an optical near field, on the plane.

Further, since the incident rays are refracted and/or reflected by the first surface and the second surface with positive optical powers, it is possible to suppress a spherical aberration and a coma aberration and especially to minimize an off-axis aberration.

In the catadioptric objective system, at least one of the first surface and the second surface is preferably an aspherical surface. Thereby, aberrations can be corrected.

The first surface of the catadioptric objective lens may be provided with a dielectric multilayer coating, which transmits incident rays and which reflects rays entering into the first surface again. Further, the second surface of the catadioptric objective lens, other than the plane portion, may be provided with a reflection coating. Thereby, efficient usage of incident rays becomes possible.

A fine structure which is of a size not more than the wavelength of the incident rays may be formed on the fourth surface of the plate. The fine structure permits an optical near field to be generated effectively and a light beam spot of a size smaller than the diffraction limit to be formed.

It is preferred to fulfill a condition d/D<0.5, in which D is the diameter of the entrance pupil, and d is the diameter of the rays passing through the second surface. When this condition is fulfilled, the component of unused light is small.

Further, it is preferred to fulfill a condition $0.1 < tP/tL < 0.7$, in which tL is the thickness of the catadioptric objective lens, and tP is the thickness of the plate. When this condition is fulfilled, the optical system achieves a good optical performance while having a small thickness.

The thickness of the adhesive agent between the second surface of the catadioptric objective lens and the third surface of the plate is preferably not more than 50 λ, in which λ is the wavelength of the incident rays. In this case, fluctuation of the converging point with changes in thickness of the adhesive agent can be minimized.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Embodiments of a catadioptric objective system and an objective system according to the present invention are hereinafter described with reference to the accompanying drawings.

General Structure and Converging Operation of Embodiments 1-4

FIGS. 1, 4, 6 and 8 show the respective structures of catadioptric objective systems according to a first, a second, a third and a fourth embodiment. FIGS. 2, 5, 7 and 9 show the respective wavefront aberration characteristics of these catadioptric objective systems.

Each of the catadioptric objective systems according to the first through fourth embodiments comprises a catadioptric objective lens 10 and a light transmitting plate 20. The catadioptric objective lens 10 has a first surface 11 and a second surface 12. The first surface 11 has a positive optical power and transmits incident rays. The second surface 12 has a positive optical power and reflects the incident rays. The second surface 12 has a plane portion 12a in the center.

The light transmitting plate 20 has a third surface 21 and a fourth surface 22 which are substantially parallel to each other, and the third surface 21 is bonded to the second surface 12 of the catadioptric objective lens 10.

In FIGS. 1, 4, 6 and 8, the lines L1 and L2 denote the outermost incident rays. These rays are first incident to the first surface 11. Then, the rays are refracted by the first surface 11 and incident to the second surface 12. The second surface 12, except the central plane portion 12a, is covered with a reflection coating, and the rays are reflected by the second surface 12.

The rays reflected by the second surface 12 enter into the first surface 11 again. The rays entering into the first surface 11 again are reflected by the first surface 11 and pass through the plane portion 12a of the second surface 12. The rays which have passed through the plane portion 12a further pass through the plate 20 and are converged in vicinity of the fourth surface 22.

Much energy gathers around the converging point, and strong heat energy is generated there. Conventionally, in a structure where rays are converged on a surface of a lens, the lens is deformed by heat, resulting in degradation of the lens. According to the first through fourth embodiments, on the other hand, the light transmitting plate 20 is bonded to the plane portion 12a of the second surface 12, and it is possible to prevent degradation of the lens 10 by making the plate 20 of a heat-conductive material and/or by providing a heat radiating structure in a place other than the converging point.

Construction Data and Aberrations

Figure 1:
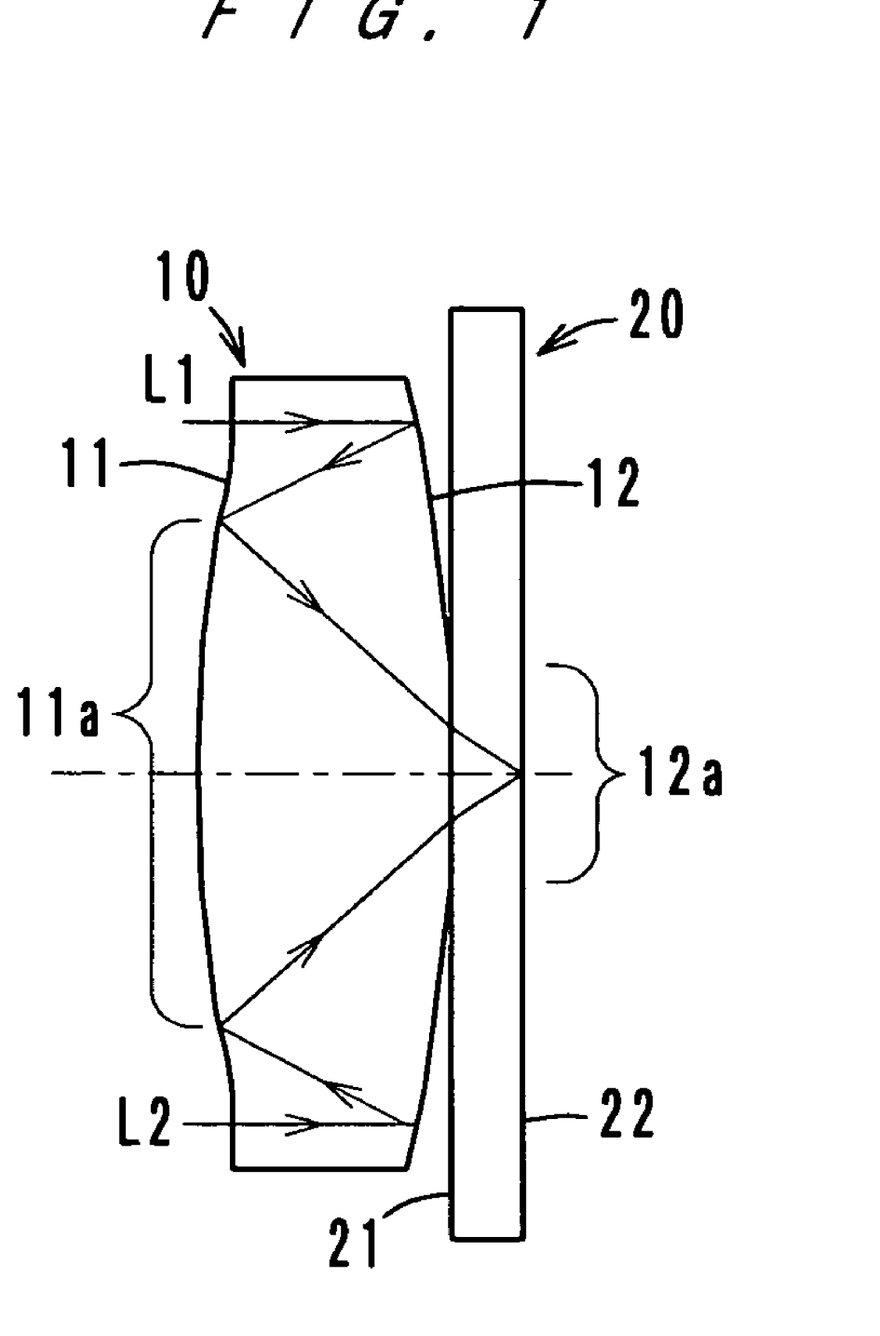
FIG. 1 is a schematic view of a catadioptric objective system according to a first embodiment of the present invention.
Figure 2:
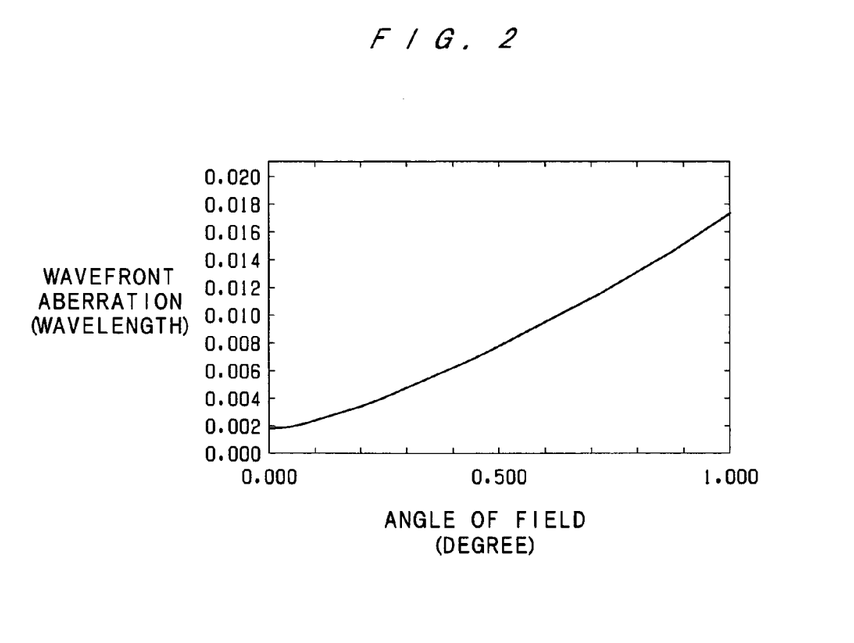
FIG. 2 is a graph which shows the wavefront aberration characteristic of the catadioptric objective system according to the first embodiment.
Figure 3:
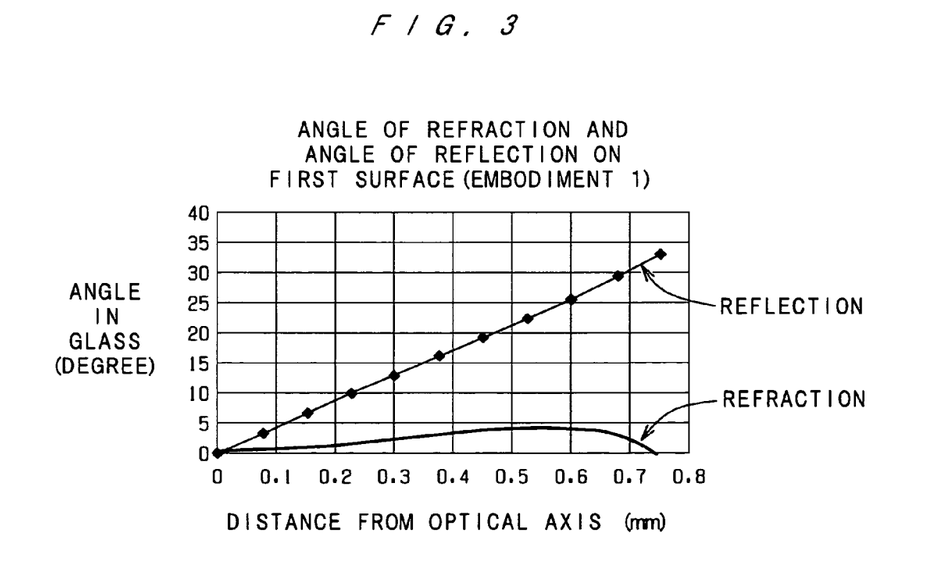
FIG. 3 is a graph which shows angle of refraction and angle of reflection of the first surface of the catadioptric objective system according to the first embodiment.
Figure 4:
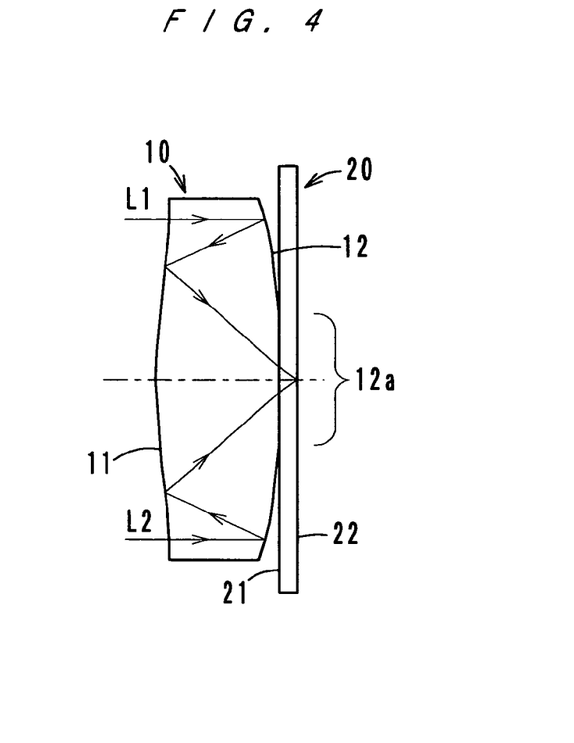
FIG. 4 is a schematic view of a catadioptric objective system according to a second embodiment.
Figure 5:
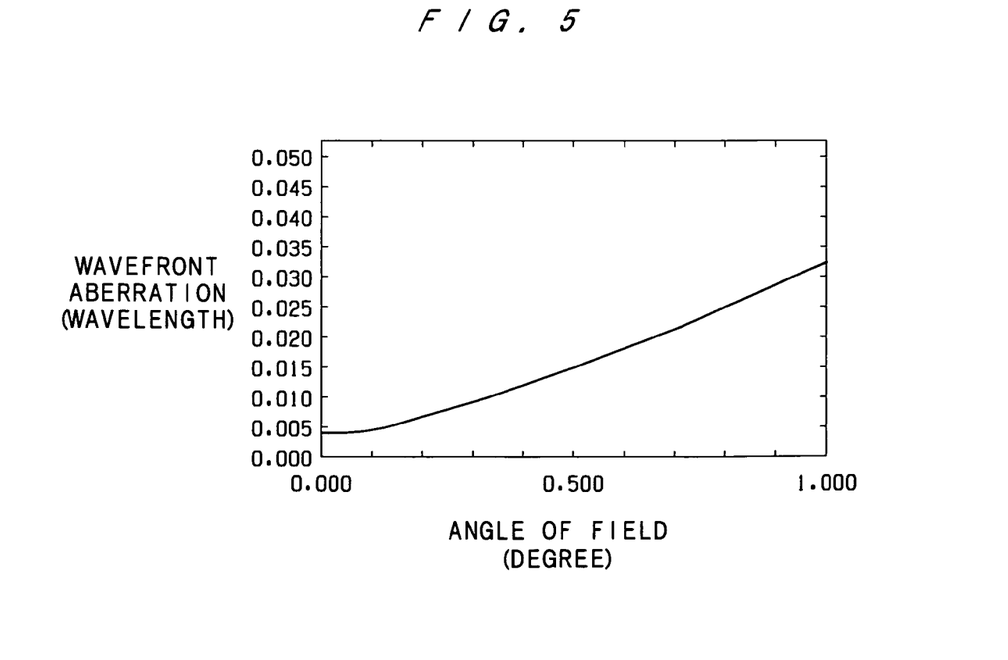
FIG. 5 is a graph which shows the wavefront aberration characteristic of the catadioptric objective system according to the second embodiment.
Figure 6:
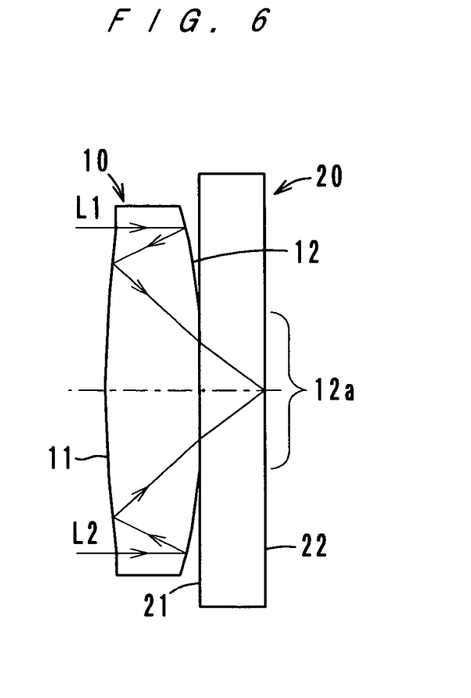
FIG. 6 is a schematic view of a catadioptric objective system according to a third embodiment.
Figure 7:
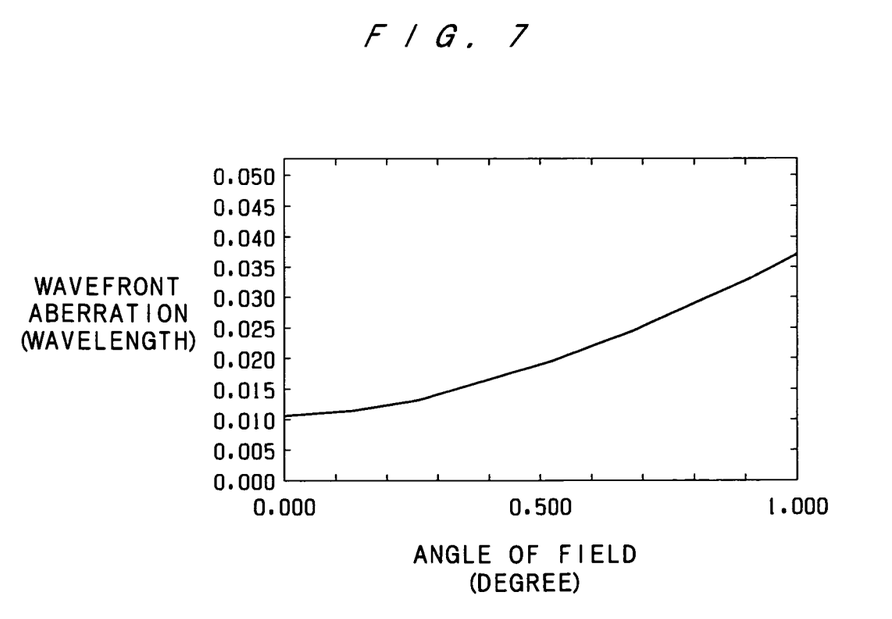
FIG. 7 is a graph which shows the wave front aberration characteristic of the catadioptric objective system according to the third embodiment.
Figure 8:
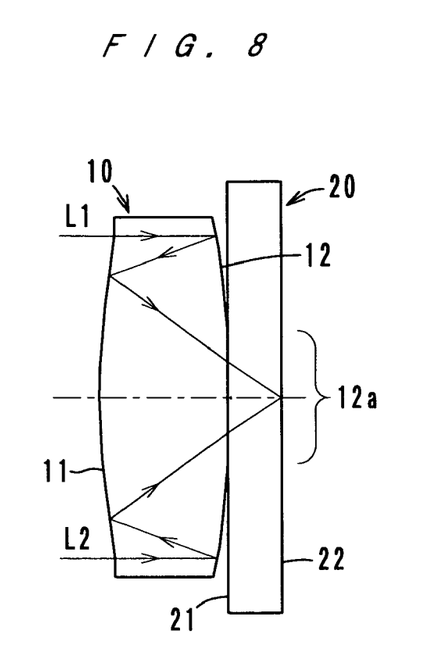
FIG. 8 is a schematic view of a catadioptric objective system according to a fourth embodiment.
Figure 9:
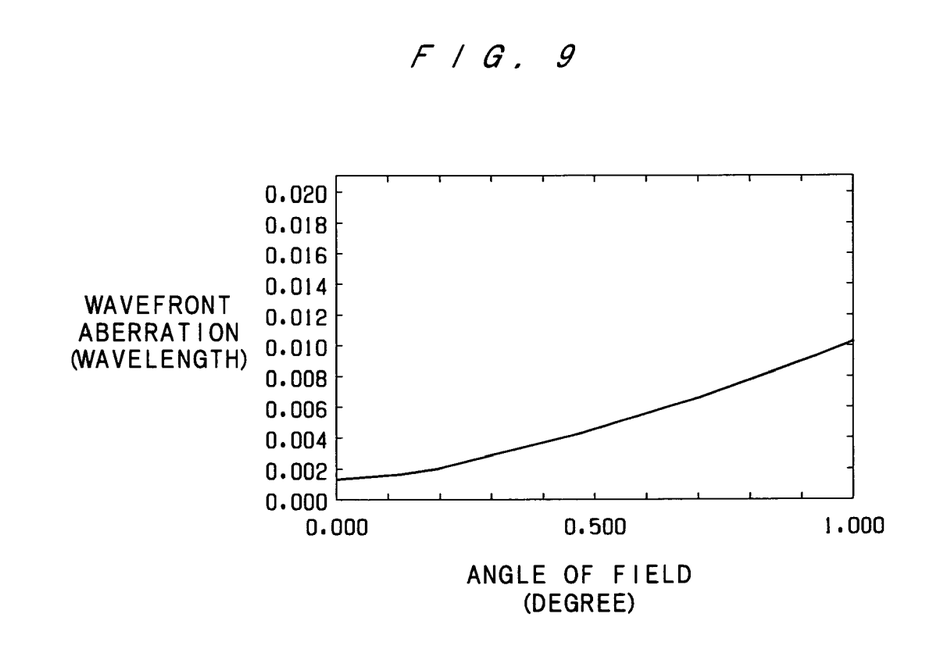
FIG. 9 is a graph which shows the wave front aberration characteristic of the catadioptric objective system according to the fourth embodiment.

The construction data of the optical systems according to the first through fourth embodiments are shown in Tables 1-4 below. The wavefront characteristics to a designed wavelength are shown in FIGS. 2, 5, 7 and 9. Also, FIG. 3 shows the angle of refraction and the angle of reflection on the first surface 11 of the optical system according to the first embodiment.

TABLE 1

(First Embodiment)

| Wavelength | 780 nm |
| Effective Diameter | 1.5 mm |
| Focal Length in the Air | 0.618 mm |
| Maximum Angle | 1 degree |

| Surface Data | First Surface | Second Surface |
| --- | --- | --- |
| Radius of Curvature | 5.03036 | −3.30794 |
| K | −23.17539 | 9.57928 |
| A4 | 1.93712E−01 | 1.17976E−01 |
| A6 | −2.31701E−01 | −2.33992E−02 |
| A8 | −1.11445E−01 | −1.20956E−01 |
| A10 | 0.00000E+00 | 9.6976E−02 |

| | |
| --- | --- |
| Distance between Vertex of First Surface and Vertex of Second Surface | 0.5309 mm |
| Thickness of Lens | 0.5262 mm |
| Thickness of Adhesive | 0.0030 mm |
| Thickness of Plate | 0.1500 mm |
| Refractive Index | |
| Lens | 1.791049 |
| Adhesive | 1.511183 |
| Plate | 1.981051 |

TABLE 2

(Second Embodiment)

| | |
|---|---|
| Wavelength | 780 nm |
| Effective Diameter | 3 mm |
| Focal Length in the Air | 1.236 mm |
| Maximum Angle | 1 degree |

| Surface Data | First Surface | Second Surface |
|---|---|---|
| Radius of Curvature | 8.72850 | −7.30086 |
| K | −28.79855 | 13.31752 |
| A4 | 2.32954E−02 | 1.38535E−02 |
| A6 | −8.32874E−03 | −1.62926E−03 |
| A8 | −4.56228E−04 | −5.89806E−04 |
| A10 | 0.00000E+00 | 1.95928E−04 |

| | |
|---|---|
| Distance between Vertex of First Surface and Vertex of Second Surface | 1.1521 mm |
| Thickness of Lens | 1.1438 mm |
| Thickness of Adhesive | 0.0300 mm |
| Thickness of Plate | 0.1500 mm |
| Refractive Index | |
| Lens | 1.824899 |
| Adhesive | 1.511183 |
| Plate | 1.981051 |

TABLE 3

(Third Embodiment)

| | |
|---|---|
| Wavelength | 405 nm |
| Effective Diameter | 1.5 mm |
| Focal Length in the Air | 0.5935 mm |
| Maximum Angle | 1 degree |

| Surface Data | First Surface | Second Surface |
|---|---|---|
| Radius of Curvature | 6.58157 | −3.05534 |
| K | −44.01478 | 5.34201 |
| A4 | 1.94960E−01 | 1.10249E−01 |
| A6 | −1.07236E−01 | 5.94278E−02 |
| A8 | −2.50580E−01 | −2.48597E−01 |
| A10 | 0.00000E+00 | 1.06492E−01 |

| | |
|---|---|
| Distance between Vertex of First Surface and Vertex of Second Surface | 0.4552 mm |
| Thickness of Lens | 0.4422 mm |
| Thickness of Adhesive | 0.0030 mm |
| Thickness of Plate | 0.3000 mm |
| Refractive Index | |
| Lens | 1.870119 |
| Adhesive | 1.530196 |
| Plate | 2.068202 |

TABLE 4

(Fourth Embodiment)

| | |
|---|---|
| Wavelength | 550 nm |
| Effective Diameter | 0.9 mm |
| Focal Length in the Air | 0.4084 mm |
| Maximum Angle | 1 degree |

| Surface Data | First Surface | Second Surface |
|---|---|---|
| Radius of Curvature | 2.53606 | −3.03174 |
| K | −14.29237 | 18.58620 |
| A4 | 5.34423E−01 | 3.52890E−01 |
| A6 | −1.17071E+00 | 1.02587E−01 |
| A8 | −7.16417E+00 | −7.38645E+00 |
| A10 | 0.00000E+00 | 1.35924E+01 |

TABLE 4-continued (Fourth Embodiment)

| | |
|---|---|
| Distance between Vertex of First Surface and Vertex of Second Surface | 0.3462 mm |
| Thickness of Lens | 0.3437 mm |
| Thickness of Adhesive | 0.0020 mm |
| Thickness of Plate | 0.1500 mm |
| Refractive Index | |
| Lens | 1.854148 |
| Adhesive | 1.518522 |
| Plate | 1.810282 |

The first surface 11 and the second surface 12 are aspherical surfaces, and the shapes of the surfaces are expressed by the following expression (1).

$$X = CY^2/\{1+(1-(1+K) \cdot C^2 \cdot Y^2)^{1/2}\} + \Sigma A^i \cdot Y^i \quad (1)$$

X: displacement from a reference surface in the direction along the optical axis
Y: height in the direction perpendicular to the optical axis
C: paraxial curvature
K: conical coefficient
$A^i$: the "i"th aspherical coefficient Incident rays to the lens 10 are refracted and/or reflected by the first surface 11 twice and by the second surface 12 once. In view of correction of aberrations, it is known that at least two spherical surfaces with positive optical powers and an aspherical surface are necessary to correct an axial aberration (spherical aberration) and an off-axis aberration (coma aberration).

Accordingly, as in the first through fourth embodiments, when rays are influenced by three surfaces with positive optical powers including one aspherical surface, the performance of this optical system is good both axially and off-axially. In other words, it is preferred in view of correction of aberrations that at least one of the first surface 11 and the second surface 12 is aspherical.

Generally, the performance of an optical system is judged to be good if the wavefront aberration is less than the Maréchal limit (less than 0.070 λ). In the first through fourth embodiments, as shown in FIGS. 2, 5, 7 and 9, the wavefront aberration to an off-axial ray at an angle of one degree is less than 0.04 λ, which is less than the Maréchal limit.

In the first through fourth embodiments, the first surface 11 performs both refraction and reflection. Therefore, the catadioptric objective lens 10 can be composed of only two optical surfaces. Although the lens 10 has a complicated optical path including refraction and reflection, the lens 10 is composed of only two surfaces. Accordingly, the lens 10 can be produced by a conventional method of producing an aspherical lens, such as a glass mold method or a plastic mold method.

Reflection Coating on the Second Surface and Efficiency of Use of Light

As mentioned above, the second surface 12, except the plane portion 12*a*, is covered with a reflection coating. Preferably, this reflection coating is formed by deposition of aluminum or silver, or is formed as a dielectric multi-layer coating comprising $TiO_2$, $SiO_2$, etc. by deposition, so that a high reflectance can be obtained. By placing a mask in front of the second surface to cover the plane portion 12*a* before performing the deposition, a coating over the entire second surface 12 other than the plane portion 12 can be formed.

Since the plane portion 12*a* of the second surface 12 is not covered with the reflection coating, there are rays which pass through the first surface 11 and then the plane portion 12a of the second surface. These rays are not converged finally and become unused light. In order to heighten the efficiency of use of light, it is preferred to minimize the unused light component. Specifically, it is preferred to fulfill the following condition (2).

$$d/D<0.5 \tag{2}$$

D: diameter of entrance pupil d: diameter of a bundle of rays passing through the second surface If the condition (2) is not fulfilled, the unused light component is large, and effective light convergence is impossible. By setting the upper limit of the condition (2) to 0.35, the light convergence will be more effective. Table 5 below shows the values d, D and d/D in the first through fourth embodiments.

TABLE 5

|  | Lens D | Plate d | Rate d/D |
| --- | --- | --- | --- |
| Embodiment 1 | 1.500 | 0.232 | 0.155 |
| Embodiment 2 | 3.000 | 0.300 | 0.100 |
| Embodiment 3 | 1.500 | 0.456 | 0.304 |
| Embodiment 4 | 0.900 | 0.231 | 0.256 |

Adhesive Agent

The plane portion 12a of the second surface 12 is bonded to the third surface 21 of the plate 20 by an adhesive agent. If this adhesive agent is thick, a bend of the plate 20 occurs due to shrinkage of the adhesive agent. In order to avoid this trouble, it is preferred that the adhesive agent is thin. Also, fluctuation in thickness of the adhesive agent causes fluctuation in position of the fourth surface 22 of the plate 20, that is, fluctuation in converging position. By minimizing the thickness of the adhesive agent, the fluctuation in position of the fourth surface 22 can be minimized. More specifically, it is desired that the thickness of the adhesive agent is not more than 50 λ (λ: wavelength of incident light).

The condition that the thickness of the adhesive agent is not more than 50 λ guarantees that a change of several percent in thickness of the adhesive agent merely causes the fourth surface to be displaced by merely several λ or less. The thickness of the adhesive agent is more desirably not more than 10 λ.

In vicinity of the fourth surface 22 of the plate 20, a converged beam spot is formed. As will be apparent from the description about the numerical aperture, when the refractive index in vicinity of the converging point is high, a large numerical aperture can be achieved, and consequently, a small beam spot can be obtained. Accordingly, it is preferred that the refractive index of the plate 20 is larger than that of the catadioptric lens 10 and larger than that of the adhesive agent. Thus, by using a plate 20 made of a material with a large refractive index, a smaller beam spot can be obtained.

Thickness of the Lens and Thickness of the Plate

The total of the thickness of the catadioptiric lens 10 and the thickness of the plate 20 determines the thickness of the whole optical system. Accordingly, in order to make a compact optical system, it is preferred to design both the thickness of the lens 10 and the thickness of the plate 20 to be small. However, simply thinning the lens 10 and the plate 20 may result in poor optical performance. Preferably, the following condition (3) is fulfilled.

$$0.1<tP/tL<0.7 \tag{3}$$

tL: thickness of the catadioptric lens tP: thickness of the light transmitting plate The expression (3) shows the condition of the rate of the thickness of the plate 20 to the thickness of the lens 10. If the rate is over the upper limit of the condition (3), the plate 20 is too thick compared with the lens 10. In this case, the distance between the first surface 11 and the second surface 12 is too short, and the height of a ray incident to the lens 10 through the first surface 11 and the height of the same ray incident to the first surface 11 again after being reflected by the second surface 12 are not very different. In order to achieve good optical performance, the difference in ray height must be large, and the lens 10 and the plate 20 must be designed so that the rate of the thickness of the plate 20 to the thickness of the lens 10 will not be beyond the upper limit of the condition (3).

On the other hand, if the rate is below the lower limit of the condition (3), theoretically, this case results in excellent optical performance. Practically, however, there is a limit in producing a thin plate 20, and therefore, the situation wherein the rate is too small means that the lens 10 is large. This is not preferable because the whole optical system becomes large.

In view of the above points, by designing the rate of the thickness of the plate 20 to the thickness of the lens 10 within a range from 0.2 to 0.5, a smaller optical system of a high performance can be obtained. Table 6 below shows the values tL, tP and tP/tL in the first through fourth embodiments.

TABLE 6

|  | Lens tL | Plate tP | Rate tP/tL |
| --- | --- | --- | --- |
| Embodiment 1 | 0.531 | 0.150 | 0.283 |
| Embodiment 2 | 1.152 | 0.150 | 0.130 |
| Embodiment 3 | 0.455 | 0.300 | 0.659 |
| Embodiment 4 | 0.346 | 0.150 | 0.433 |

Numerical Aperture

Incident rays are converged in vicinity of the fourth surface 22 of the plate 20. The converged light is transmitted to a storage medium (not shown) located in vicinity of the converging point, and thereby storage and/or reproduction of information is carried out.

The numerical aperture NA is defined by the following expression (4).

$$NA=n\times\sin\theta \tag{4}$$

n: refractive index of a medium in vicinity of the converging point

θ: maximum angle of convergent rays to the optical axis

When incident rays are converged in vicinity of the vertex of the second surface 12 and when the catadioptric objective lens 10 is made of ordinary glass, the refractive index n of lens 10 is 1.5 or more, and the numerical aperture is 1.0 or more. Then, a very small beam spot can be obtained.

In order to perform storage and/or reproduction of information by use of a very small beam spot made by an optical system with a numerical aperture of 1.0 or more, a storage medium must be located in vicinity of the converging point. An optical near field is not propagated and is exponentially attenuated at a distance. Therefore, the distance between the converging point and the surface of a storage medium is preferably not more than the wavelength of incident light. Further, if the distance is less than ⅓ of the wavelength, a stronger optical near field can be obtained on the surface of the storage medium.

Coating on the First Surface

In the following, three cases of providing different kinds of coatings on the first surface 11 of the catadioptric objective lens 10 are discussed.

The first is to provide an aluminum or silver coating in the central part of the first surface 11, the aluminum or silver coating having a characteristic of reflecting rays like the reflection coating provided on the second surface 12. This reflection coating is provided in an area 11a shown in FIG. 1. In this case, although the central rays are reflected by the reflection coating and cannot enter into the lens 10, the peripheral rays can be effectively used for convergence.

The second is to provide a half mirror coating on the entire of the first surface 11. This coating has a characteristic like a half mirror, and transmits light 50% and reflects light 50%. When this coating is provided on the first surface 11, all of the incident rays can be used for convergence regardless of the position of incidence. However, rays react to this half mirror coating twice, and consequently, at the most only a quarter of the incident energy can be used, and the efficiency of energy cannot be over ¼. Also, at present, it is difficult to form a reflection coating which reflects both p-polarized light at almost 50% and an s-polarized light at almost 50% whether it is a dielectric multilayer coating or a metal coating. Therefore, the energy efficiency is much lower than ¼.

The third is to form, on the first surface 11, a dielectric multilayer coating which has a characteristic of transmitting most of the rays incident to the first surface 11 for the first time and reflecting most of the rays entering into the first surface 11 for the second time. By providing this coating, higher energy efficiency can be achieved compared with the cases of providing the above-described two kinds of coatings.

FIG. 3 is a graph which shows the angle of refraction of incident rays performed by the first surface 11 of the objective lens 10 and the angle of reflection of the rays which enter into the first surface 11 again after being reflected by the second surface 12 (=incident angle) in the first embodiment. The axis of abscissas indicates the distance (mm) from the optical axis of the catadioptric objective lens 10, and the axis of ordinates indicates the angle (degree). The angle of refraction of a ray incident to a point on the first surface 11 of the objective lens 10 is different from the angle of reflection of a ray incident to the same point on the first surface 11, and the characteristic (transmission/reflection) of the coating of the third kind is determined from the difference.

The dielectric multilayer coating may be, for example, a 40-layer coating shown by Table 7. In Table 7, the material with a refractive index of 2.2 is $TiO_2$, and the material with a refractive index of 1.5 is $SiO_2$.

TABLE 7

| Layer No. | Refractive Index | Thickness (nm) |
|---|---|---|
| Incidence | 1.6227 | |
| 40 | 1.5 | 70 |
| 39 | 2.2 | 43 |
| 38 | 1.5 | 70 |
| 37 | 2.2 | 43 |

TABLE 7-continued

| Layer No. | Refractive Index | Thickness (nm) |
|---|---|---|
| 36 | 1.5 | 70 |
| 35 | 2.2 | 43 |
| 34 | 1.5 | 136.78 |
| 33 | 2.2 | 43 |
| 32 | 1.5 | 70 |
| 31 | 2.2 | 43 |
| 30 | 1.5 | 70 |
| 29 | 2.2 | 43 |
| 28 | 1.5 | 95.37 |
| 27 | 2.2 | 43 |
| 26 | 1.5 | 70 |
| 25 | 2.2 | 43 |
| 24 | 1.5 | 70 |
| 23 | 2.2 | 43 |
| 22 | 1.5 | 70 |
| 21 | 2.2 | 43 |
| 20 | 1.5 | 137.96 |
| 19 | 2.2 | 43 |
| 18 | 1.5 | 70 |
| 17 | 2.2 | 43 |
| 16 | 1.5 | 70 |
| 15 | 2.2 | 43 |
| 14 | 1.5 | 70 |
| 13 | 2.2 | 43 |
| 12 | 1.5 | 70 |
| 11 | 2.2 | 43 |
| 10 | 1.5 | 70 |
| 9 | 2.2 | 43 |
| 8 | 1.5 | 96.16 |
| 7 | 2.2 | 43 |
| 6 | 1.5 | 127.16 |
| 5 | 2.2 | 43 |
| 4 | 1.5 | 70 |
| 3 | 2.2 | 43 |
| 2 | 1.5 | 70 |
| 1 | 2.2 | 43 |
| Emergence | 1 | |

Figure 10:
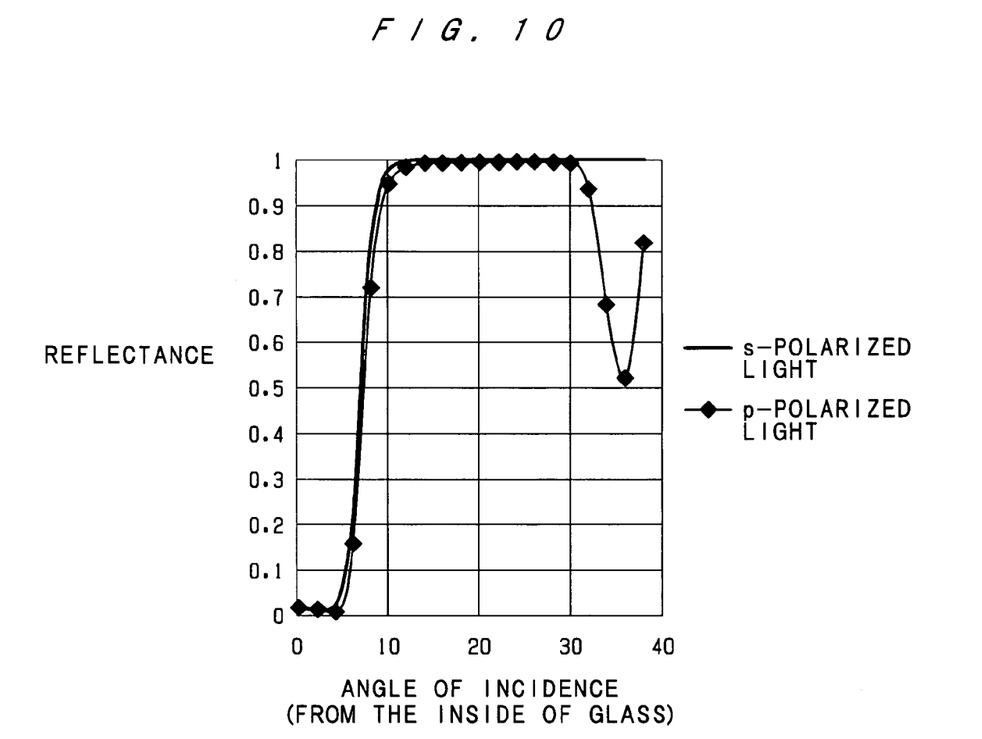
FIG. 10 is a graph which shows the relationship between the angle of incidence to a dielectric multilayer coating and the reflectance.

FIG. 10 shows the angle dependency of the reflectance of the dielectric multilayer coating shown by FIG. 7 when the wavelength of incident rays is 405 nm. With this dielectric multilayer coating, rays entering thereto from the inside of the glass at angles larger than approximately seven degrees are reflected, and rays entering thereto at angles smaller than approximately seven degrees are transmitted. For example, in the first embodiment, all the rays incident to the catadioptric objective lens 10 pass through the first surface 11. The rays are reflected by the second surface 12 and enter into the first surface 11 again. At this time, while the rays around the optical axis (within a distance of approximately 0.15 mm from the optical axis) pass through the first surface 11, the other rays, that is, most of the rays entering into the first surface 11 after being reflected by the second surface 12 are reflected by the first surface 11. When rays of another wavelength are to be incident to the lens 10, the thickness of each layer of the dielectric multilayer coating should be changed in accordance with the wavelength. Thereby, the same angle dependency of the reflectance can be achieved. The dielectric multilayer coating is a laminate of a high-refractive material and a low-refractive material alternately stacked, and because of the laminate structure, the dielectric multilayer coating achieves a high reflectance toward rays incident thereto at a large angle.

Such a dielectric multilayer coating is preferably composed of 20 or more layers. Generally, a dielectric multilayer coating has a characteristic of having a steeper rise in angle characteristic and a steeper rise in wavelength characteristic as comprising a larger number of layers. In each of the first through fourth embodiments, when the dielectric multilayer coating which has a steep rise in angle characteristic and a steep rise in wavelength characteristic is provided on the first surface 11 of the catadioptric objective lens 10, the efficiency of use of light is higher, which is preferable.

Distance from a Storage/Reproduction Medium

In utilizing the converged beam spot for storage and/or reproduction of information, in order to utilize the numerical aperture of the beam spot, the storage medium is located preferably in vicinity of the converged beam spot. Specifically, rays converged by an optical system with a numerical aperture of over 1 are totally reflected at the converging point and cannot be emergent from the optical system. Even in this case, however, electromagnetic waves effuse in extremely vicinity of the converging point (within the optical near field), and by locating a storage medium within this area, storage and/or reproduction of information can be performed.

More specifically, it is desired to design the distance between the fourth surface 22 of the plate 20 and the storage medium to be not more than a half of the wavelength. Further, it is more desired for efficient storage and reproduction of information to design the distance to be not more than one third of the wavelength.

One method of controlling the distance between a storage medium and an objective lens is controlling the distance by monitoring the capacitance between these two objects. When the emergent surface of the objective lens is a curved surface, the distance between the lens and the storage medium varies from portion to portion. In this case, if the above method is adopted, the distance information depends on the position of an electrode for measurement of capacitance, and control is difficult. On the other hand, according to the first through fourth embodiments, the distance between the objective lens and the storage medium is entirely constant. Therefore, noise is less regardless of the position of the electrode for measurement of capacitance, and good control is possible.

On the light converging point, a beam spot of a size in conformity with the numerical aperture of the lens 10 is formed. Specifically, when the incident rays are uniform in intensity, an Airly disc is formed, and the diameter D of the central spot of the Airly disc is expressed as follows.

$$D = 1.22 \lambda/NA \quad (5)$$

Accordingly, if the numerical aperture is 1.5 and if the wavelength is 400 nm, a beam spot with a diameter D of 325 nm can be obtained.

Fine Structure

In order to obtain a smaller beam spot, it is preferred to provide an optical near field generating structure, which is of a size not more than the wavelength, in vicinity of the light converging point.

Figure 11A:
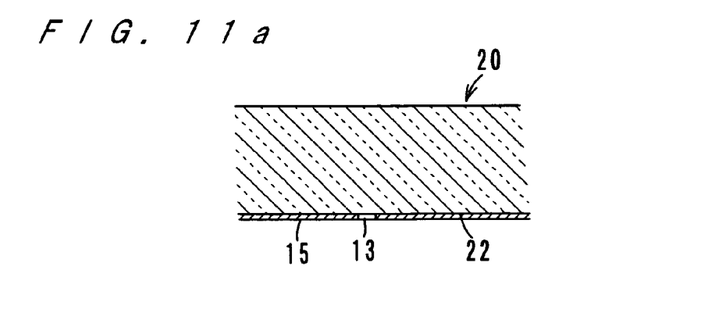
FIGS. 11a, 11b, 11c and 11d show examples of a fine structure formed on a light converging surface, FIGS. 11a, 11b and 11c being sectional views and FIG. 11d being a perspective view.
Figure 11B:
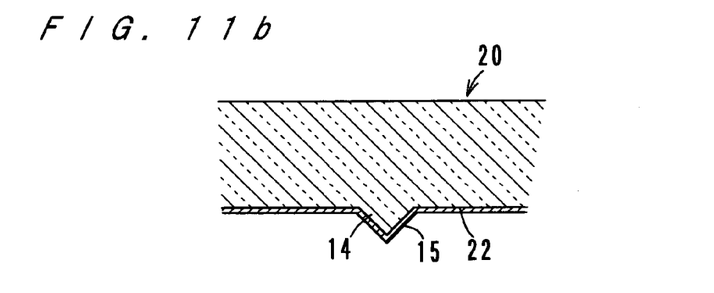
Figure 11C:
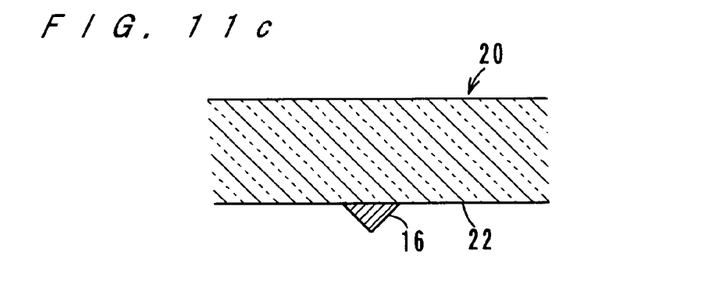
Figure 11D:
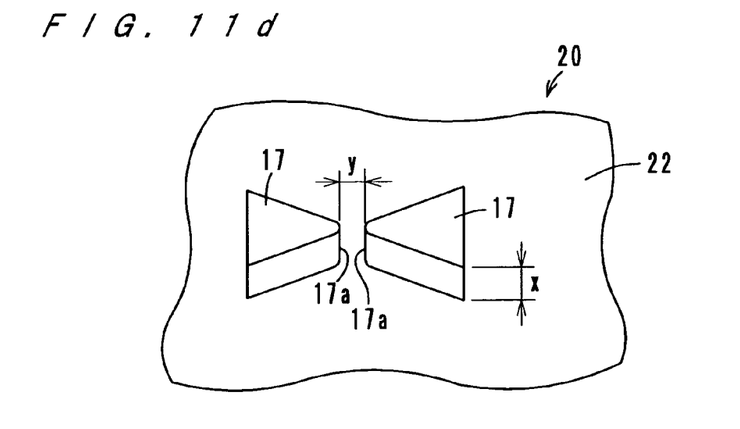

The fine structure for generating an optical near field may be, for example, a hole 13 of a size not more than the wavelength made in a metal coating 15 (see FIG. 11a), a dielectric conic projection 14 (which may be coated with metal 15) with a tip of which radius of curvature is not more than the wavelength (see FIG. 11b) or the like. Alternatively, as shown by FIG. 11c, a metal conic projection 16 with a tip of which radius of curvature is not more than the wavelength may be provided. Further, as shown by FIG. 11d, a projection 17 in the shape of a bow tie may be provided. The shape of a bow tie means a symmetrical arrangement of two triangles with their respective vertexes placed opposite to each other at a specified distance. The mutually opposite vertexes are round (have curvatures). With this arrangement, when rays coming from the internal of the glass are converged, a strong electric field can be excited around the two vertexes due to surface plasmon. Also, as the fine structure, a triangular projection, which is a half of the bow-tie like projection 17, may be provided. The bow-tie like projection 17 and the triangular projection are preferably metal, such as gold, silver, aluminum or the like.

When light reacts to a fine structure smaller than the wavelength, in vicinity of the fine structure, an optical near field with energy strength in conformity with the size of the fine structure is generated. Accordingly, by providing a fine structure smaller than the wavelength in vicinity of the light converging point and by positioning a storage medium in vicinity of the fine structure, only an area of the storage medium within a range in accordance with the size of the fine structure interacts with the optical near field. Thereby, storage and/or reproduction of information in a very small area are possible.

Further, the size of the fine structure is preferably less than one fifth of the wavelength. Specifically, the fine structure is an aluminum conic projection with a diameter of 300 nm and a height of 300 nm and a tip of which radius is not more than 80 nm. The bow-tie like projection 17 shown by FIG. 11d is composed of two parts each of which has a thickness x of 100 nm and a tip 17a of which radius is not more than 80 nm. The two parts are positioned with their respective tips 17a opposite to each other at a distance y of not more than 80 nm.

The distance between the storage medium and the fine structure is desired to be smaller than the size of the fine structure. In the art of storage/reproduction by use of an optical near field, it is known that the range in which an optical near field effusing from a fine structure acts is the same extent as the size of the fine structure, that is, the optical near field attenuates in the range of the same extent as the size of the fine structure. Therefore, in order to achieve efficient storage/reproduction, it is an important condition to place the storage medium such that the distance between the storage medium and the fine structure is smaller than the size of the fine structure.

In the first through fourth embodiments, the catadioptric objective lens 10 and the light transmitting plate 20 are fabricated separately. Accordingly, forming the fine structure on the fourth surface 22 of the plate 20 by etching or lithography is like forming a fine structure on a plate such as a wafer.

Specifically, the optical system can be structure by cutting a wafer with fine structures already formed thereon into a specified size and by bonding the cut piece of wafer to the plane portion 12a of the second surface 12 of the lens 10. By adopting the method in which fine structures are formed on a wafer, a large number of plates 20 can be produced in one process, and thereby, the productivity is improved.

It is preferred that a plurality of fine structures are formed on the fourth surface 22 of the plate 20. This facilitates positioning of the converging point with reference to the fine structures. Further, by arranging a plurality of fine structures in a matrix, positioning of the converging point become easier.

Other Embodiments

The detailed constructions of the catadioptric objective lens and the light transmitting plate are arbitrary, and the construction data and the wavefront aberration described above are merely examples.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A catadioptric objective system used for storage/reproduction of information by use of an optical near field, the catadioptric objective system comprising:
a catadioptric objective lens comprising a first surface and a second surface, the first surface having a positive optical power and transmitting incident rays, the second surface having a positive optical power, reflecting incident rays and having a plane portion in a center; and
a light transmitting plate comprising a third surface and a fourth surface which are substantially parallel to each other, the third surface being bonded to the second surface of the catadioptric objective lens by an adhesive agent;
wherein incident rays extending approximately to the periphery of the catadioptric objective lens pass through the first surface of the catadioptric objective lens, are reflected by the second surface, are reflected by the first surface, pass through the plane portion of the second surface and are converged in vicinity of the fourth surface of the plate.

2. A catadioptric objective system according to claim 1, wherein at least one of the first surface and the second surface of the catadioptric objective lens is an aspherical surface.

3. A catadioptric objective system according to claim 1, wherein a dielectric multilayer coating is provided on the first surface of the catadioptric objective lens, the dielectric multilayer coating transmitting incident rays and reflecting rays entering into the first surface again after being reflected by the second surface.

4. A catadioptric objective system according to claim 1, wherein a reflection coating is provided on the second surface of the catadioptric objective lens other than the plane portion.

5. A catadioptric objective system according to claim 1, wherein at least one fine structure with a size not more than a wavelength of the incident rays is formed on the fourth surface of the plate.

6. A catadioptric objective system according to claim 5, wherein a plurality of fine structures with a size not more than a wavelength of the incident rays are formed on the fourth surface of the plate.

7. A catadioptric objective system according to claim 5, wherein a metal thin film is coated on the fourth surface of the plate, a hole with a size not more than a wavelength of the incident rays being made in the metal thin film at a position where the incident rays are to be converged.

8. A catadioptric objective system according to claim 5, wherein a dielectric conic projection with a tip of which radius of curvature is not more than the wavelength of the incident rays is formed on the fourth surface of the plate at a position where the incident rays are to be converged.

9. A catadioptric objective system according to claim 8, wherein the conic projection is covered with a metal coating.

10. A catadioptric objective system according to claim 5, wherein a metal conic projection with a tip of which radius of curvature is not more than the wavelength of the incident rays is formed on the fourth surface of the plate at a position where the incident rays are to be converged.

11. A catadioptric objective system according to claim 5, wherein a bow-tie like projection is formed on the fourth surface of the plate at a position where the incident rays are to be converged.

12. A catadioptric objective system according to claim 5, wherein a triangular projection is formed on the fourth surface of the plate at a position where the incident rays are to be converged.

13. A catadioptric objective system used for storage/reproduction of information by use of an optical near field, the catadioptric objective system comprising:
a catadioptric objective lens comprising a first surface and a second surface, the first surface having a positive optical power and transmitting incident rays, the second surface having a positive optical power, reflecting incident rays and having a plane portion in a center; and
a light transmitting plate comprising a third surface and a fourth surface which are substantially parallel to each other, the third surface being bonded to the second surface of the catadioptric objective lens by an adhesive agent;
wherein incident rays pass through the first surface of the catadioptric objective lens, are reflected by the second surface, are reflected by the first surface, pass through the plane portion of the second surface and are converged in vicinity of the fourth surface of the plate, and
wherein the following condition is fulfilled:

$$d/D<0.5$$

wherein D is a diameter of an entrance pupil, and d is a diameter of a bundle of rays passing through the second surface.

14. A catadioptirc objective system according to claim 1, wherein the following condition is fulfilled:

$$0.1<tP/tL<0.7$$

wherein tL is a thickness of the catadioptric objective lens and tP is a thickness of the light transmitting plate.

15. A catadioptric objective system according to claim 1, wherein the adhesive agent between the second surface of the catadioptric objective lens and the third surface of the plate has a thickness not more than $50\lambda$, wherein $\lambda$ is a wavelength of the incident rays.

16. A catadioptric objective system according to claim 1, of which numerical aperture is not less than 1.

17. A catadioptric objective system according to claim 1, wherein a refractive index of the plate is larger than a refractive index of the catadioptric objective lens.

18. An objective system for storing/reproducing information in/from a storage medium, said objective system comprising:
a catadioptric optical element comprising:
a first surface having a positive optical power and transmitting incident rays; and
a second surface having a positive optical power, reflecting incident rays and having a plane portion in a center; and
a light transmitting plate comprising:
a third surface bonded to the second surface of the catadioptric objective lens by an adhesive agent; and
a fourth surface substantially in parallel to the third surface, wherein:
incident rays extending approximately to the periphery of the catadioptric objective lens pass through the first surface of the catadioptric optical element, are reflected by the second surface, are reflected by the first surface, pass through the plane portion of the second surface and are converged in vicinity of the fourth surface; and by use of the converged rays, information is stored/reproduced in/from a storage medium.

19. An objective system according to claim 18, wherein the storage medium is located at a distance from the fourth surface of the plate, the distance being not more than a half of a wavelength of the incident rays.

20. An objective system according to claim 18, wherein the rays converged on the fourth surface generate an optical near field.

21. An objective system according to claim 20, wherein at least one fine structure with a size not more than a wavelength of the incident rays is formed on the fourth surface of the plate.

* * * * *